(12) United States Patent
Takebayashi et al.

(10) Patent No.: US 12,194,846 B2
(45) Date of Patent: Jan. 14, 2025

(54) VEHICLE CONTROL APPARATUS, VEHICLE, AND VEHICLE CONTROL SYSTEM

(71) Applicant: SUBARU CORPORATION, Tokyo (JP)

(72) Inventors: Yosuke Takebayashi, Tokyo (JP); Takeshi Yoneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/731,934

(22) Filed: Jun. 3, 2024

(65) Prior Publication Data
US 2024/0317051 A1  Sep. 26, 2024

Related U.S. Application Data

(63) Continuation of application No. PCT/JP2022/038331, filed on Oct. 14, 2022.

(51) Int. Cl.
*B60W 40/06* (2012.01)
*B60K 23/08* (2006.01)
*B60W 30/188* (2012.01)
*B60W 60/00* (2020.01)

(52) U.S. Cl.
CPC ....... B60K 23/0808 (2013.01); *B60W 30/188* (2013.01); *B60W 40/06* (2013.01); *B60W 60/001* (2020.02); *B60W 2510/22* (2013.01); *B60W 2520/406* (2013.01); *B60W 2552/35* (2020.02)

(58) Field of Classification Search
CPC . B60K 23/0808; B60W 30/188; B60W 40/06; B60W 60/001; B60W 2510/22; B60W 2520/406; B60W 2552/35
See application file for complete search history.

(56) References Cited

U.S. PATENT DOCUMENTS 10,953,887 B2 * 3/2021 Magnusson ............ G08G 1/164

FOREIGN PATENT DOCUMENTS

| CN | 116802697 A | * | 9/2023 | ................ B60T 7/22 |
|---|---|---|---|---|
| DE | 102007037508 B4 | * | 9/2022 | ............ B60T 8/1755 |
| EP | 3560783 A1 | * | 10/2019 | ............ B60W 40/06 |
| JP | 2007-043837 A | | 2/2007 | |
| JP | 2020-131823 A | | 8/2020 | |
| JP | 2020-169672 A | | 10/2020 | |
| JP | 2021-02161 A | | 1/2021 | |
| WO | WO-2019134963 A1 | * | 7/2019 | ......... B60G 17/0165 |
| WO | WO-2022140657 A1 | * | 6/2022 | ............ B60W 10/22 |

OTHER PUBLICATIONS

International Search Report received in PCT Application No. PCT/JP2022/038331, dated Dec. 20, 2022, w/ English Translation.

* cited by examiner

*Primary Examiner* — Justin Holmes
(74) *Attorney, Agent, or Firm* — Rimon P.C.

(57) ABSTRACT

A vehicle control apparatus for a vehicle including at least two wheel-pairs of right and left wheels includes one or more processors, and one or more memories communicably coupled to the one or more processors. Upon straight traveling of the vehicle, the one or more processors predicts time of generation of a difference in a suspension stroke amount between the right and left wheels in any one wheel-pair out of the at least two wheel-pairs, and reduces driving torque adapted to drive the right and left wheels in the one wheel-pair of the first vehicle at or before the time of the generation predicted.

11 Claims, 11 Drawing Sheets

VEHICLE CONTROL APPARATUS, VEHICLE, AND VEHICLE CONTROL SYSTEM

CROSS-REFERENCE TO RELATED APPLICATIONS

This application is continuation of International Application No. PCT/JP2022/038331, filed on Oct. 14, 2022, the entire contents of which are hereby incorporated by reference.

BACKGROUND

The disclosure relates to a vehicle control apparatus, a vehicle, a vehicle control system, and a non-transitory recording medium.

An existing technique for stable traveling of a vehicle is described in, for example, Japanese Unexamined Patent Application Publication (JP-A) No. 2007-043837. In the technique described in JP-A No. 2007-043837, a driving force for each wheel is corrected in a direction in which a yaw motion of a vehicle caused by a change in toe angle associated with suspension strokes of right and left steered wheels decreases, when a difference in vehicle height between a right-wheel side and a left-wheel side is determined to be greater than or equal to a predetermined value while the vehicle of which four wheels (two front wheels and two rear wheels) are driven by respective electric motors is traveling straight at a predetermined vehicle speed or higher. This technique secures the stability of traveling regardless of the presence of a road surface disturbance.

SUMMARY

An aspect of the disclosure provides a vehicle control apparatus for a vehicle that includes at least two wheel-pairs of right and left wheels. The vehicle control apparatus includes one or more processors, and one or more memories communicably coupled to the one or more processors. The one or more processors are configured to predict, upon straight traveling of a first vehicle to which the vehicle control apparatus is to be applied, time of generation of a difference in a suspension stroke amount between the right and left wheels in any one wheel-pair out of the at least two wheel-pairs of the first vehicle based on: data that is acquired from a second vehicle traveling in front of the first vehicle and that relates to undulations or irregularities of a road surface in front of the first vehicle in a traveling direction of the first vehicle, or data on a region where the difference in the suspension stroke amount has been generated between the right and left wheels of the second vehicle upon traveling of the second vehicle; a distance from the first vehicle to the second vehicle; and a vehicle speed of the first vehicle. The one or more processors are further configured to reduce driving torque adapted to drive the right and left wheels in the one wheel-pair of the first vehicle at or before the time of the generation predicted.

An aspect of the disclosure provides a vehicle including a vehicle control apparatus for a vehicle that includes at least two wheel-pairs of right and left wheels. The vehicle control apparatus includes one or more processors, and one or more memories communicably coupled to the one or more processors. The one or more processors are configured to predict, upon straight traveling of a first vehicle to which the vehicle control apparatus is to be applied, time of generation of a difference in a suspension stroke amount between the right and left wheels in any one wheel-pair out of the at least two wheel-pairs of the first vehicle based on: data that is acquired from a second vehicle traveling in front of the first vehicle and that relates to undulations or irregularities of a road surface in front of the first vehicle in a traveling direction of the first vehicle, or data on a region where the difference in the suspension stroke amount has been generated between the right and left wheels of the second vehicle upon traveling of the second vehicle; a distance from the first vehicle to the second vehicle; and a vehicle speed of the first vehicle. The one or more processors are further configured to reduce driving torque adapted to drive the right and left wheels in the one wheel-pair of the first vehicle at or before the time of the generation predicted.

An aspect of the disclosure provides a vehicle control system including a vehicle control apparatus for a first vehicle, and a vehicle control apparatus for a second vehicle. The first vehicle and the second vehicle each include at least two wheel-pairs of right and left wheels. The vehicle control apparatus for the second vehicle traveling in front of the first vehicle is configured to transmit, to the vehicle control apparatus for the first vehicle, data that relates to undulations or irregularities of a road surface in front of the second vehicle in a traveling direction of the second vehicle, or data on a region where a difference in a suspension stroke amount has been generated between the right and left wheels of the second vehicle upon traveling of the second vehicle. The vehicle control processor for the first vehicle includes one or more processors, and one or more memories communicably coupled to the one or more processors. The one or more processors are configured to predict, upon straight traveling of the first vehicle, time of generation of the difference in the suspension stroke amount between the right and left wheels in any one wheel-pair out of the at least two wheel-pairs of the first vehicle based on: data that is acquired from the vehicle control apparatus for the second vehicle and that relates to undulations or irregularities of a road surface in front of the first vehicle in a traveling direction of the first vehicle, or the data on the region where the difference in the suspension stroke amount has been generated between the right and left wheels of the second vehicle upon the traveling of the second vehicle; and a distance from the first vehicle to the second vehicle. The one or more processors are further configured to reduce driving torque adapted to drive the right and left wheels in the one wheel-pair of the first vehicle at or before the time of the generation predicted.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
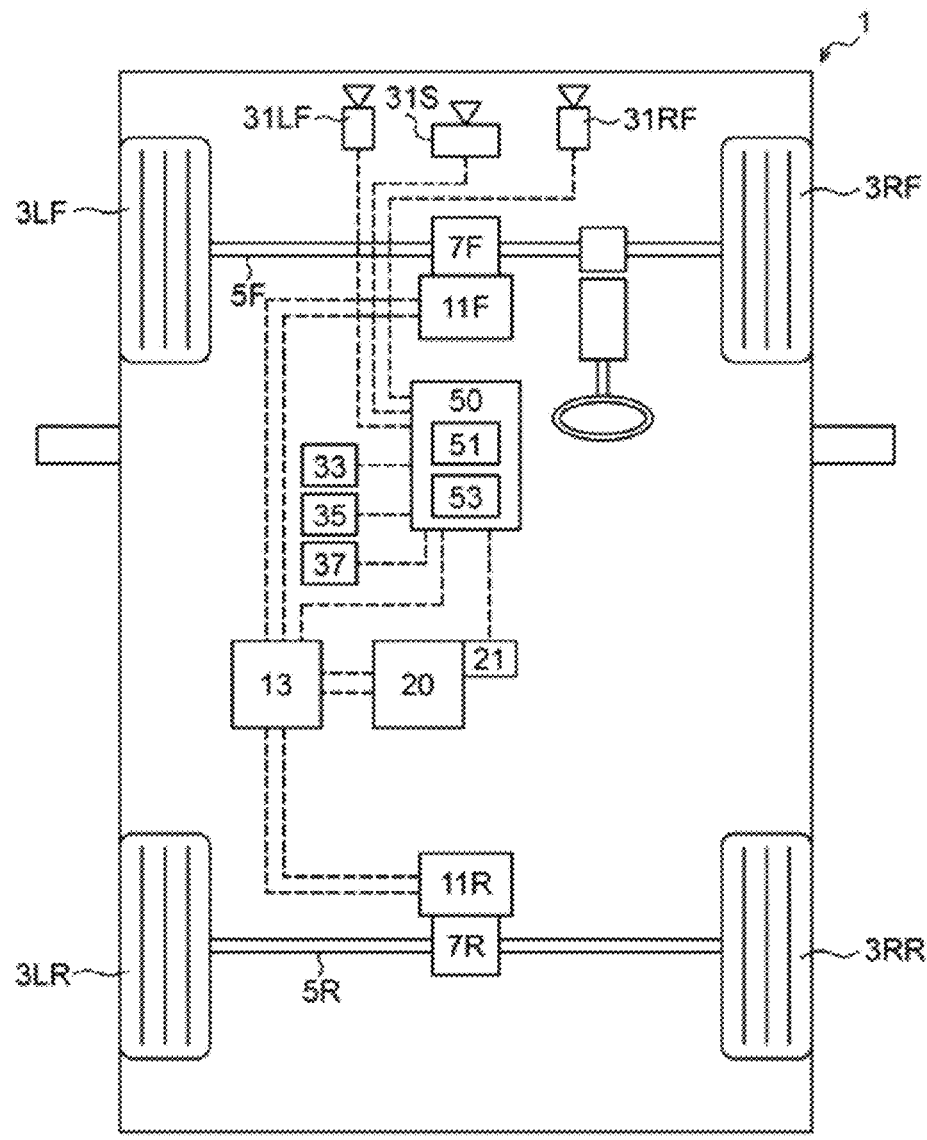
FIG. 1 is a schematic diagram of a configuration example of a vehicle including a vehicle control apparatus according to one example embodiment of the disclosure.

According to a technique disclosed in JP-A No. 2007-043837, a driving force for each wheel is corrected after the generation of a difference in vehicle height between a left-wheel side and a right-wheel side greater than or equal to a predetermined value. This generates a time difference between destabilization of traveling of a vehicle caused by a road surface disturbance and the correction. If the traveling of the vehicle is stabilized by correcting the driving force at an earlier timing, it is possible to reduce an influence of the road surface disturbance and to maintain the traveling of the vehicle without making an occupant of the vehicle recognize destabilization of the traveling of the vehicle.

It is desirable to provide a vehicle control apparatus, a vehicle, a vehicle control system, and a non-transitory recording medium each of which makes it possible to detect the destabilization of traveling of a vehicle due to a road surface disturbance at an earlier timing and to reflect the detection on the correction of driving torque.

In the following, some example embodiments of the disclosure are described in detail with reference to the accompanying drawings. Note that the following description is directed to illustrative examples of the disclosure and not to be construed as limiting to the disclosure.

Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale.

Throughout the present specification and the drawings, elements having substantially the same function and configuration are denoted with the same reference numerals to avoid any redundant description. In addition, elements that are not directly related to any embodiment of the disclosure are unillustrated in the drawings.

1. First Example Embodiment

1-1. Configuration Example of Vehicle

First, an example of an overall configuration of a vehicle to which a vehicle control apparatus according to a first example embodiment of the disclosure is applicable is described.

FIG. 1 is a schematic diagram of a configuration example of a vehicle 1 including a vehicle control apparatus 50 according to the first example embodiment. The vehicle 1 illustrated in FIG. 1 may be a four-wheel vehicle including a left-front wheel 3LF, a right-front wheel 3RF, a left-rear wheel 3LR, and a right-rear wheel 3RR. Hereinafter, the left-front wheel 3LF and the right-front wheel 3RF may be collectively referred to as "front wheels 3F", and the left-rear wheel 3LR and the right-rear wheel 3RR may be collectively referred to as "rear wheels 3R". The vehicle 1 may further include a front-wheel drive motor 11F and a rear-wheel drive motor 11R as drive power sources that generate driving torque for the vehicle 1. The front-wheel drive motor 11F and the rear-wheel drive motor 11R may be configured to drive the front wheels 3F and the rear wheels 3R respectively and independently from each other.

The front-wheel drive motor 11F and the rear-wheel drive motor 11R may be, for example, three-phase AC radial motors or axial gap motors. However, the number of phases is not limited to a particular number. The front-wheel drive motor 11F may output driving torque to be transmitted to the front wheels 3F via a differential 7F and a front-wheel drive shaft 5F. The rear-wheel drive motor 11R may output driving torque to be transmitted to the rear wheels 3R via a differential 7R and a rear-wheel drive shaft 5R. Further, the front-wheel drive motor 11F may receive rotational torque of the front wheels 3F via the front-wheel drive shaft 5F while the vehicle 1 is decelerating, and may perform regenerative power generation. The rear-wheel drive motor 11R may receive rotational torque of the rear wheels 3R via the rear-wheel drive shaft 5R while the vehicle 1 is decelerating, and may perform regenerative power generation. The driving and regeneration of the front-wheel drive motor 11F and the driving and regeneration of the rear-wheel drive motor 11R may be controlled by the vehicle control apparatus 50.

Rated output torque may be set for each of the front-wheel drive motor 11F and the rear-wheel drive motor 11R so that stable torque is continuously outputted to these motors. The rated output torque of the front-wheel drive motor 11F and the rated output torque of the rear-wheel drive motor 11R may be identical to each other or different from each other.

The vehicle 1 may include an inverter unit 13, a battery 20, and the vehicle control apparatus 50 as a system that drives the front-wheel drive motor 11F and the rear-wheel drive motor 11R. The battery 20 may include a chargeable and dischargeable secondary battery. The battery 20 may be, for example, a lithium-ion battery having a rated voltage of 200V; however, the rated voltage and the type of the battery 20 are not limited to a particular rate and a particular type. The battery 20 may be coupled to the front-wheel drive motor 11F and the rear-wheel drive motor 11R via the inverter unit 13, and may store electric power to be supplied to the front-wheel drive motor 11F and the rear-wheel drive motor 11R. The battery 20 may be provided with a battery management device 21 that detects an open voltage, an output voltage, a battery temperature, and the like of the battery 20 and transmits the detected values to the vehicle control apparatus 50.

The inverter unit 13 may include a first inverter circuit that controls the driving of the front-wheel drive motor 11F, and a second inverter circuit that controls the driving of the rear-wheel drive motor 11R. The first inverter circuit may convert DC power swept from the battery 20 into three-phase AC power, and may supply the three-phase AC power to a stator of the front-wheel drive motor 11F. In addition, the first inverter circuit may convert three-phase AC power obtained as a result of the regenerative power generation by the front-wheel drive motor 11F into DC power, and may charge the battery 20 with the DC power. Similarly, the second inverter circuit may convert DC power swept from the battery 20 into three-phase AC power, and may supply the three-phase AC power to a stator of the rear-wheel drive motor 11R. In addition, the second inverter circuit may convert three-phase AC power obtained as a result of the regenerative power generation by the rear-wheel drive motor 11R into DC power, and may charge the battery 20 with the DC power. The driving of the inverter unit 13 may be controlled by the vehicle control apparatus 50.

Note that a converter circuit that increases a voltage may be provided between the battery 20 and the inverter circuit.

The vehicle control apparatus 50 may be configured to control the driving of the front-wheel drive motor 11F and the driving of the rear-wheel drive motor 11R when one or more processors execute a computer program. The computer program may cause the one or more processors to execute an operation to be performed by the vehicle control apparatus 50. The operation will be described in detail later. The computer program executed by the one or more processors may be recorded in a recording medium such as a storage unit (memory) 53 provided in the vehicle control apparatus 50, or may be recorded in a recording medium built in the vehicle control apparatus 50, or any recording medium externally attachable to the vehicle control apparatus 50.

The recording medium in which the computer program is recorded may be: a hard disk; a magnetic medium such as a floppy disk or a magnetic tape; an optical recording medium such as a compact disk read-only memory (CD-ROM), a digital versatile disk (DVD), a solid state drive (SSD), or Blu-ray (registered trademark); a magneto-optical medium such as a floptical disk; a storage such as a RAM or a ROM; a flash memory such as a universal serial bus (USB) memory; or another medium in which programs are able to be stored.

To the vehicle control apparatus 50, a surrounding environment sensor 31, a vehicle-state sensor 33, and a global navigation satellite system (GNSS) sensor 35 may be coupled via a dedicated line or a communication line such as a controller area network or a local interconnect network (LIN). In addition, the inverter unit 13 may be coupled to the vehicle control apparatus 50 via a dedicated line or a communication line such as the CAN or the LIN. The configuration of the vehicle control apparatus 50 will be described in detail later.

The surrounding environment sensor 31 may detect a surrounding environment of the vehicle 1. In the first example embodiment, the surrounding environment sensor 31 may be configured to detect at least the shape of a road in front of the vehicle 1. In the first example embodiment, the surrounding environment sensor 31 of the vehicle 1 may include front imaging cameras 31LF and 31RF, and a light detection and ranging (LiDAR) 31S.

The front imaging cameras 31LF and 31RF may each capture an image of the front of the vehicle 1 and generate image data. The front imaging cameras 31LF and 31RF may each include an imaging device such as a charged coupled device (CCD) or a complementary metal-oxide-semiconductor (CMOS). The front imaging cameras 31LF and 31RF may transmit the generated image data to the vehicle control apparatus 50. The front imaging cameras 31LF and 31RF in the vehicle 1 illustrated in FIG. 1 may serve as a stereo camera including a pair of right and left cameras; however, the vehicle 1 may be provided with a monocular camera. The vehicle 1 may include, in addition to the front imaging cameras 31LF and 31RF, a rear imaging camera provided on a rear portion of the vehicle 1 to capture an image of an environment behind the vehicle 1.

The LiDAR 31S may transmit an optical wave, receive a reflected wave of the optical wave, and detect a distance to an obstacle and a position of the obstacle based on the time from the transmission of the optical wave to the reception of the reflected wave. The LiDAR 31S may transmit the detection data to the vehicle control apparatus 50. The surrounding environment sensor 31 of the vehicle 1, which acquires data on the surrounding environment of the vehicle 1, may include one or more of a radar sensor and an ultrasonic sensor, instead of or in addition to the LiDAR 31S. The radar sensor may be a millimeter-wave radar sensor.

The vehicle-state sensor 33 may include one or more sensors that detect an operational state and a behavior of the vehicle 1. The vehicle-state sensor 33 may include, for example, one or more of a steering angle sensor, an accelerator position sensor, a brake stroke sensor, a brake pressure sensor, and an engine speed sensor to detect an operational state of the vehicle 1 such as a steering angle of a steering wheel or a steered wheel, an accelerator position, a brake operation amount, and an engine speed. The vehicle-state sensor 33 may further include, for example, one or more of a vehicle speed sensor, an acceleration sensor, and an angular velocity sensor to detect a behavior of the vehicle 1 such as a vehicle speed, a longitudinal acceleration rate, a lateral acceleration rate, and a yaw rate. The vehicle-state sensor 33 may transmit a sensor signal including the detected data to the vehicle control apparatus 50.

The GNSS sensor 35 may receive satellite signals transmitted from a plurality of satellites, and may detect a position of the GNSS sensor 35, that is, a position of the vehicle 1. The GNSS sensor 35 may transmit the data on the detected position of the vehicle 1 to the vehicle control apparatus 50.

A stroke sensor 37 may detect stroke amounts of respective suspensions provided on the left-front wheel 3LF, the right-front wheel 3RF, the left-rear wheel 3LR, and the right-rear wheel 3RR. In the following description, the stroke amount of the suspension may be also referred to as a suspension stroke. The stroke sensor 37 may transmit a sensor signal including the detected suspension stroke to the vehicle control apparatus 50. As to be described later, a process at the stroke sensor 37 may be omitted in the first example embodiment, and the stroke sensor 37 may thus not necessarily be included. Instead of the stroke sensor 37, another sensor may be included which is configured to detect torque transmitted from the left-front wheel 3LF, the right-front wheel 3RF, the left-rear wheel 3LR, and the right-rear wheel 3RR to a road surface.

Figure 2:
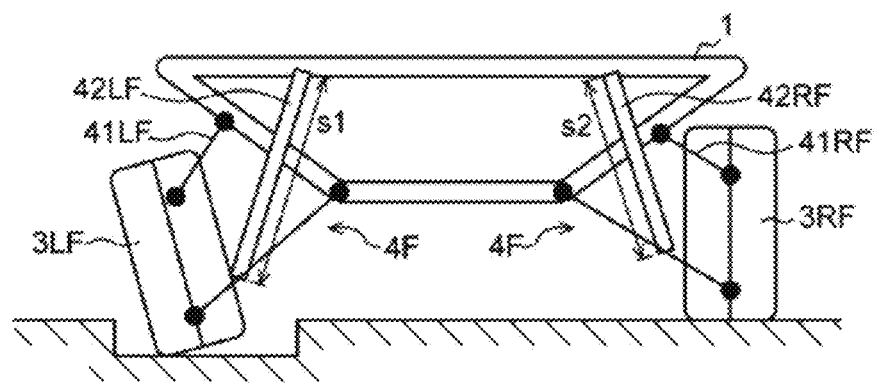
FIG. 2 is a schematic diagram describing a suspension stroke of the vehicle according to one example embodiment of the disclosure.

FIG. 2 is a schematic diagram describing the suspension stroke of the vehicle 1. Although a suspension 4F provided on a front-wheel side is described here with reference to FIG. 2, the same may apply to a rear-wheel side. The suspension 4F may include an arm 41LF and a spring 42LF that are provided on the left-front wheel 3LF, and an arm 41RF and a spring 42RF that are provided on the right-front wheel 3RF. The springs 42LF and 42RF and a non-illustrated shock absorber may absorb shock applied to the wheels. This suppresses vibrations of the body of the vehicle 1 caused by fine irregularities on the road surface.

For example, when the left-front wheel 3LF is relatively subducted with respect to the right-front wheel 3RF due to large irregularities on the road surface as in the example illustrated in FIG. 2, the spring 42LF may be relatively extended with respect to the right spring 42RF so as to absorb the difference in height between the left-front wheel 3LF and the right-front wheel 3RF. The suspension 4F may be designed so that the corresponding wheel is in contact with the road surface at a perpendicular angle upon normal traveling. Accordingly, a ground contact area of the wheel may increase while the vehicle 1 is making a turn or the like. Therefore, for example, when the spring 42LF is largely extended due to a significant difference in height between the left-front wheel 3LF and the right-front wheel 3RF as described above, the left-front wheel 3LF may incline and come into contact with the road surface at an angle which is not perpendicular. As a result, the ground contact area of the left-front wheel 3LF may become smaller than that of the right-front wheel 3RF. This can generate the difference between the amount of torque transmitted from the left-front wheel 3LF to the road surface and that from the right-front wheel 3RF to the road surface, affecting the traveling stability. For example, imbalance between the transmission torque to the left-front wheel 3LF and the transmission torque to the right-front wheel 3RF can be generated when the vehicle 1 travels straight, affecting straight traveling stability.

To address such a concern, in the first example embodiment, time of generation of the difference in suspension stroke amount between the right and left wheels is predicted. For example, in the example of the suspension 4F on the front-wheel side illustrated in FIG. 2, the time of the generation of the difference between a suspension stroke amount s1 of the spring 42LF and a suspension stroke amount s2 of the spring 42RF may be predicted. Further, the driving torque for the front wheels 3F or the driving torque for the rear wheels 3R is reduced at or before the predicted time of the generation. When the difference in suspension stroke amount is generated between the right and left wheels, it is estimated that imbalance is generated between the transmission torque to the right wheel and the transmission torque to the left wheel due to the difference in ground contact area between the right wheel and the left wheel. Therefore, the driving torque to be transmitted to the wheels at which the difference in suspension stroke amount is generated is reduced to eliminate or reduce the imbalance of the transmission torque. This improves the straight traveling stability. Although not illustrated, the same may apply to the suspension on the rear-wheel side.

1-2. Vehicle Control Apparatus

Next, the vehicle control apparatus 50 of the vehicle 1 according to the first example embodiment will be described in detail.

1-2-1. Configuration Example of Vehicle Control Apparatus 50

Figure 3:
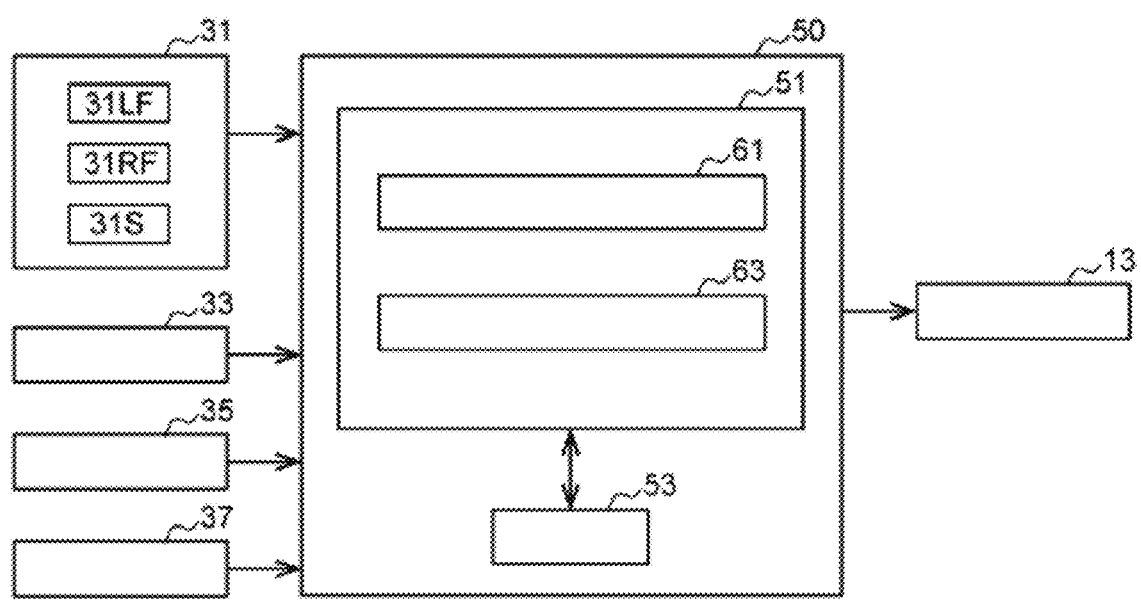
FIG. 3 is a block diagram of a configuration example of the vehicle control apparatus illustrated in FIG. 1.

FIG. 3 is a block diagram of a configuration example of the vehicle control apparatus 50 illustrated in FIG. 1. The vehicle control apparatus 50 may include a processing unit 51 and a storage unit 53. The processing unit 51 may include one or more processors such as CPUs. Part or the entirety of the processing unit 51 may be updatable software such as firmware, or may be a program module or the like to be executed in response to a command from the CPU or the like. The storage unit 53 may include a memory such as a random-access memory (RAM) or a read-only memory (ROM). Note that the number or type of the storage unit 53 is not limited to a particular number or type. The storage unit 53 may store data such as a computer program to be executed by the processing unit 51, various parameters and detection data to be used in arithmetic processing, and results of the arithmetic processing.

1-2-2. Configuration of Processing Unit 51

The processing unit 51 of the vehicle control apparatus 50 may include a prediction processor 61 and a torque control processor 63. These processors may be implemented when the processor such as a CPU executes a computer program; however, some of these processors may be analog circuitry. In the following, the configuration of each processor in the processing unit 51 is described, following which an exemplary processing operation performed by each processor in the processing unit 51 is described.

Prediction Processor

When the vehicle 1 travels straight, the prediction processor 61 predicts the time of the generation of the difference in suspension stroke amount at least between the front wheels 3F or between the rear wheels 3R. For example, the prediction processor 61 may predict the time of the generation of the difference in suspension stroke amount based on: the data that is detected by the surrounding environment sensor 31 configured to detect the surrounding environment of the vehicle 1 and that relates to the undulations or irregularities of the road surface in front of the vehicle 1 in the traveling direction of the first vehicle; and on a vehicle speed of the vehicle 1.

The data that relates to the undulations or irregularities of the road surface may include a distance from the vehicle 1 to the region. Based on the distance to the region and on the vehicle speed of the vehicle 1, the prediction processor 61 may predict the time of the generation of the difference in suspension stroke amount between the left-front wheel 3LF and the right-front wheel 3RF or between the left-rear wheel 3LR and the right-rear wheel 3RR. Further, the prediction processor 61 may predict the magnitude of the difference in suspension stroke amount between the left-front wheel 3LF and the right-front wheel 3RF or between the left-rear wheel 3LR and the right-rear wheel 3RR based on the results of detection of the degree of undulations of the road surface or the sizes of irregularities on the road surface.

The prediction processor 61 may determine the position and the traveling direction of the vehicle 1 on high-precision map data based on the position data on the vehicle 1 transmitted from the GNSS sensor 35, and may acquire data on the shape of the road in front of the vehicle 1 in the traveling direction of the vehicle 1 by referring to the high-precision map data. The high-precision map data may be stored in the storage unit 53, or may be stored in an external server that the prediction processor 61 is communicable with via a wireless communicator.

Torque Control Processor

The torque control processor 63 reduces the driving torque adapted to drive the front wheels 3F or the rear wheels 3R based on the result of the prediction by the prediction processor 61, that is, at or before the predicted time of the generation of the difference in suspension stroke amount at least between the front wheels 3F or between the rear wheels 3R. For example, the torque control processor 63 may reduce the driving torque adapted to drive the front wheels 3F to a predetermined value, which may be, for example, zero, at or before the predicted time of the generation of the difference in suspension stroke amount between the front wheels 3F.

When the prediction processor 61 estimates the magnitude of the difference in suspension stroke amount between the right and left wheels, the torque control processor 63 may set a reduction amount of the driving torque for the front wheels 3F based on the estimated magnitude of the difference. In this case, the torque control processor 63 may reduce the driving torque adapted to drive the rear wheels 3R to a predetermined value at or before the predicted time of the generation of the difference in suspension stroke amount between the right-rear wheel 3RR and the left-rear wheel 3LR.

In addition, when the driving torque for the front wheels 3F is reduced, the torque control processor 63 may add driving torque corresponding to the reduction amount of the driving torque for the front wheels 3F to the driving torque adapted to drive the rear wheels 3R. This maintains an overall driving torque for the vehicle 1 even when the driving torque for the front wheels 3F is reduced. When a margin allowed to be added to the driving torque for the rear wheels 3R is smaller than the reduction amount of the driving torque for the front wheels 3F, the torque control processor 63 may correct the reduction amount of the driving torque for the front wheels 3F to an amount corresponding to the margin of the driving torque for the rear wheels 3R. Similarly, when the driving torque for the rear wheels 3R is reduced, the torque control processor 63 may add the driving torque corresponding to the reduction amount of the driving torque for the rear wheels 3R to the driving torque adapted to drive the front wheels 3F.

1-3. Exemplary Processing Operation

Heretofore, the configuration example of the vehicle control apparatus 50 of the vehicle 1 according to the first example embodiment has been described. Next, an exemplary processing operation performed by the vehicle control apparatus 50 of the vehicle 1 will be described with reference to a flowchart.

Figure 4:
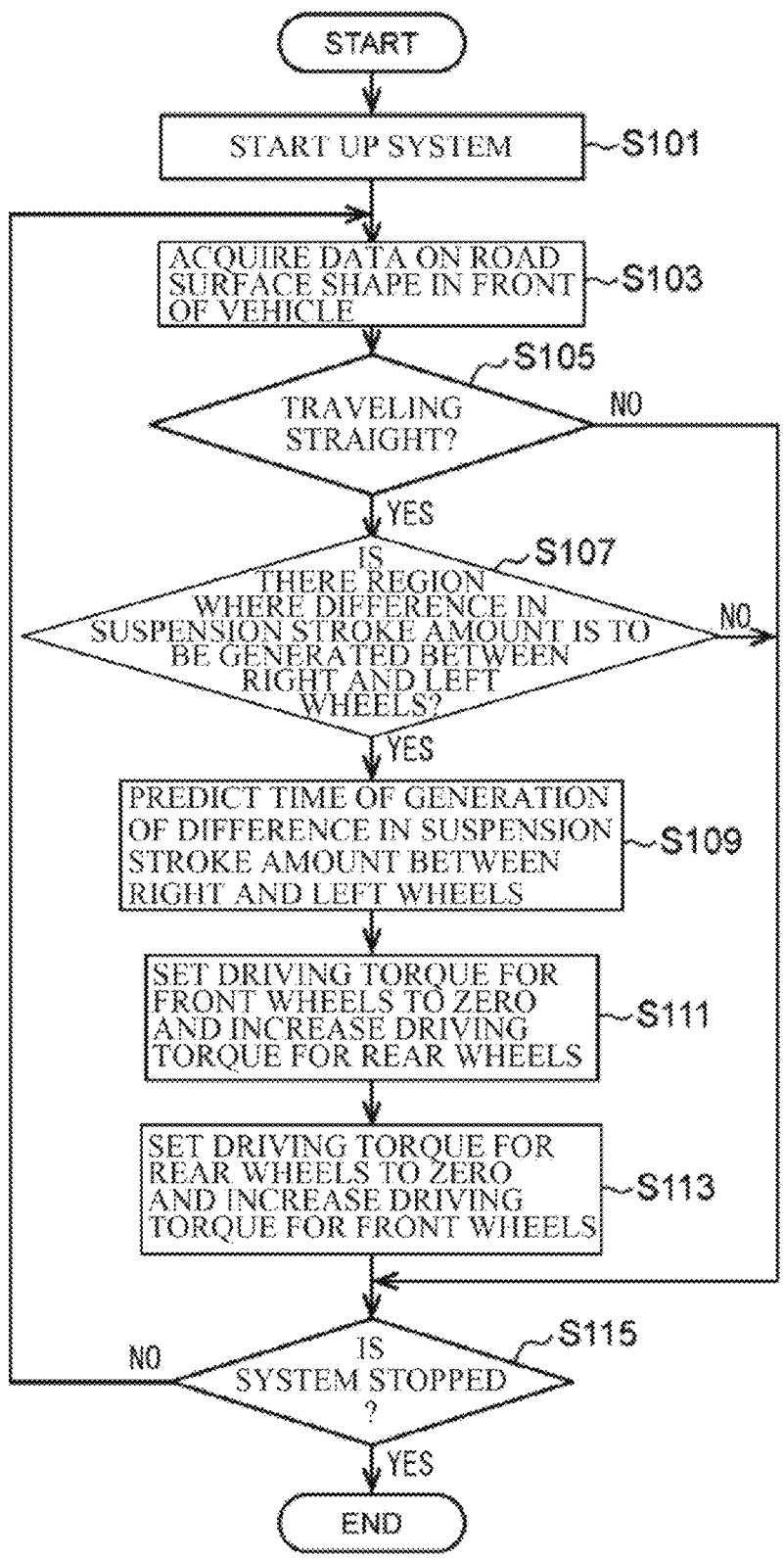
FIG. 4 is a flowchart of an operation performed by the vehicle control apparatus according to one example embodiment of the disclosure.

FIG. 4 is a flowchart of an operation performed by a vehicle control apparatus 50A of the vehicle 1 according to the first example embodiment. In the first example embodiment described below, the time of the generation of the difference in suspension stroke amount between the right and left wheels may be predicted using sensors such as a camera and a LIDAR, and the driving torque may be controlled at or before the predicted time of the generation.

First, when a drive system of the vehicle 1 starts up (Step S101), the processing unit 51 may acquire the data on the shape of the road surface in front of the vehicle 1 in the traveling direction of the vehicle 1 (Step S103). For example, to recognize the shape of the road, the prediction processor 61 may detect a measurement target, such as a lane line, a curbstone, or a guardrail on the road in front of the vehicle 1 based on the detection data transmitted from the front imaging cameras 31LF and 31RF and the LiDAR 31S included in the surrounding environment sensor 31. In addition, the prediction processor 61 may calculate a distance to each of multiple portions of the measurement target present within a measurement range of the surrounding environment sensor 31, to thereby recognize the shape of the road. Based on the data on the calculated distance to each of the portions, the prediction processor 61 may calculate the shape of the road surface.

In Step S105, the prediction processor 61 may determine whether the vehicle 1 is traveling straight. When the vehicle 1 is traveling straight (Step S105: YES), the prediction processor 61 may execute a process described below. It may be determined that the vehicle 1 is traveling straight when a steering angle of the steering wheel or the steered wheel detected by the vehicle-state sensor 33 is zero or within a predetermined range close to zero, for example. When the vehicle 1 is traveling straight, the prediction processor 61 may determine whether a region where the difference in suspension stroke amount is to be generated between the right and left wheels is present based on the shape of the road surface, such as the undulations or irregularities of the road surface in front of the vehicle 1 in the traveling direction of the vehicle 1, detected by the surrounding environment sensor 31 (Step S107). When the region where the difference in suspension stroke amount is to be generated between the right and left wheels is present (S107: YES), the prediction processor 61 may predict the time of the generation of the difference in suspension stroke amount between the front wheels 3F and that between the rear wheels 3R based on the distance to the region and the vehicle speed of the vehicle 1 (Step S109).

Note that the region where the difference in suspension stroke amount is to be generated between the right and left wheels may be a part of the detected road surface shape at which one of the right side and the left side of the vehicle 1 is to be raised or lowered relative to the other. For example, the prediction processor 61 may determine that the difference in suspension stroke amount is to be generated between the right and left wheels, in a region where the difference in height of the road surface on a predicted trajectory between the left-front wheel 3LF and the left-rear wheel 3LR or between the right-front wheel 3RF and the right-rear wheel 3RR exceeds a threshold upon straight traveling of the vehicle 1. Alternatively, the prediction processor 61 may determine that the difference in suspension stroke amount is to be generated between the right and left wheels, when determining that a recess or a protrusion having a size greater than a threshold is present on the predicted trajectory of the left-front wheel 3LF and the left-rear wheel 3LR, and the right-front wheel 3RF and the right-rear wheel 3RR of the vehicle 1 upon straight traveling based on the result of the detection of irregularities on the road surface in front of the vehicle 1 in the traveling direction of the vehicle 1.

When the time of the generation of the difference in suspension stroke amount between the right and left wheels is predicted in Step S109 described above, the torque control processor 63 may reduce the driving torque at or before the predicted time of the generation. For example, the torque control processor 63 may set the driving torque for the front wheels 3F to zero (Step S111) at or before first predicted time of the generation of the difference in suspension stroke amount between the front wheels 3F. In this case, the torque control processor 63 may increase the driving torque for the rear wheels 3R by a reduction amount of the driving torque for the front wheels 3F to maintain the overall driving torque of the vehicle 1. After the front wheels 3F pass through the region, the torque control processor 63 may restore the driving torque for the front wheels 3F and the driving torque for the rear wheels 3R to the original states. For example, the timing at which the driving torque is restored may be determined based on: the undulations of the road surface and the distance of the irregularities of the road surface that are predicted by the surrounding environment sensor 31 based on the result of detection; and the vehicle speed of the vehicle 1. Alternatively, the timing at which the driving torque is restored may be determined by actually measuring the difference in suspension stroke amount between the right and left wheels with the stroke sensor 37.

Similarly, the torque control processor 63 may set the driving torque for the rear wheels 3R to zero and increase the driving torque for the front wheels 3F by a reduction amount of the driving torque for the rear wheels 3R at or before second predicted time of the generation of the difference in suspension stroke amount between the rear wheels 3R (Step S113). After the rear wheels 3R pass through the region, the torque control processor 63 may restore the driving torque for the front wheels 3F and the driving torque for the rear wheels 3R to the original states. The processing described above may be repeated until the drive system of the vehicle 1 is stopped (Step S115).

1-4. Effect

According to the first example embodiment of the disclosure described above, when there are undulations or irregularities on the road surface in front of the vehicle 1 in the traveling direction of the vehicle 1, the time of the generation of the difference in suspension stroke amount between the right and left wheels is predicted. Further, the vehicle control apparatus 50 reduces any one of the driving torque for the front wheels 3F and the driving torque for the rear wheels 3R to zero at or before the predicted time of the generation. This helps to prevent the difference in magnitude between the torque transmitted from the right wheel to the road surface and the torque transmitted from the left wheel to the road surface from being generated due to the difference in suspension stroke amount between the right and left wheels. It is therefore possible to prevent the traveling stability from decreasing.

Note that, in the first example embodiment described above, the vehicle 1 may include the single front-wheel drive motor 11F provided on the front-wheel side, and the single rear-wheel drive motor 11R provided on the rear-wheel side. However, the vehicle 1 to which the vehicle control apparatus 50 according to the first example embodiment is applicable is not limited to this example. The vehicle control apparatus 50 according to the first example embodiment may be applied to a vehicle including respective driving motors for the right and left wheels provided on at least one of the front-wheel side and the rear-wheel side.

For example, in a case where two driving motors are provided on the rear-wheel side, the driving torque for the two driving motors serving as the rear-wheel drive motors 11R may be reduced at or before the predicted time of the generation of the difference in suspension stroke amount between the right and left wheels. This makes it possible to provide a similar effect as that described above. The same may apply to a case where two driving motors are provided on the front-wheel side. In this case, to prevent the difference in torque from being generated between the right and left wheels, the driving torque may be reduced by setting the left drive motor and the right drive motor as one pair. The same may apply to other example embodiments described below.

Further, in the first example embodiment described above, the vehicle 1 may be: a vehicle including driving torque transmission paths through which the driving torque is to be transmitted to the front wheels 3F and the rear wheels 3R and that are separatable from each other; a vehicle configured to transmit the driving torque to the front wheels 3F and the rear wheels 3R, respectively and independently from each other; or a vehicle configured to transmit the driving torque to the front wheels 3F or the rear wheels 3R. Further, the driving torque for the wheels at which the difference in suspension stroke amount is to be generated may be set to zero. However, the same processing may be applied to, for example, a case where the vehicle 1 includes a driving torque transmission path which is common between the front wheels 3F and the rear wheels 3R, and a case where the vehicle 1 is driven by either the pair of front wheels 3F or the pair of rear wheels 3R. In this case, the overall driving torque for the vehicle 1 may be temporarily reduced, for example, to zero, at or before the predicted time of the generation of the difference in suspension stroke amount between the front wheels 3F or between the rear wheels 3R. In this case, the process adapted to increase the driving torque of the other pair of wheels by the reduction amount of the driving torque of the one pair of wheels may not be executed. The same may apply to other example embodiments described below.

1-5. Modification Example

Figure 5:
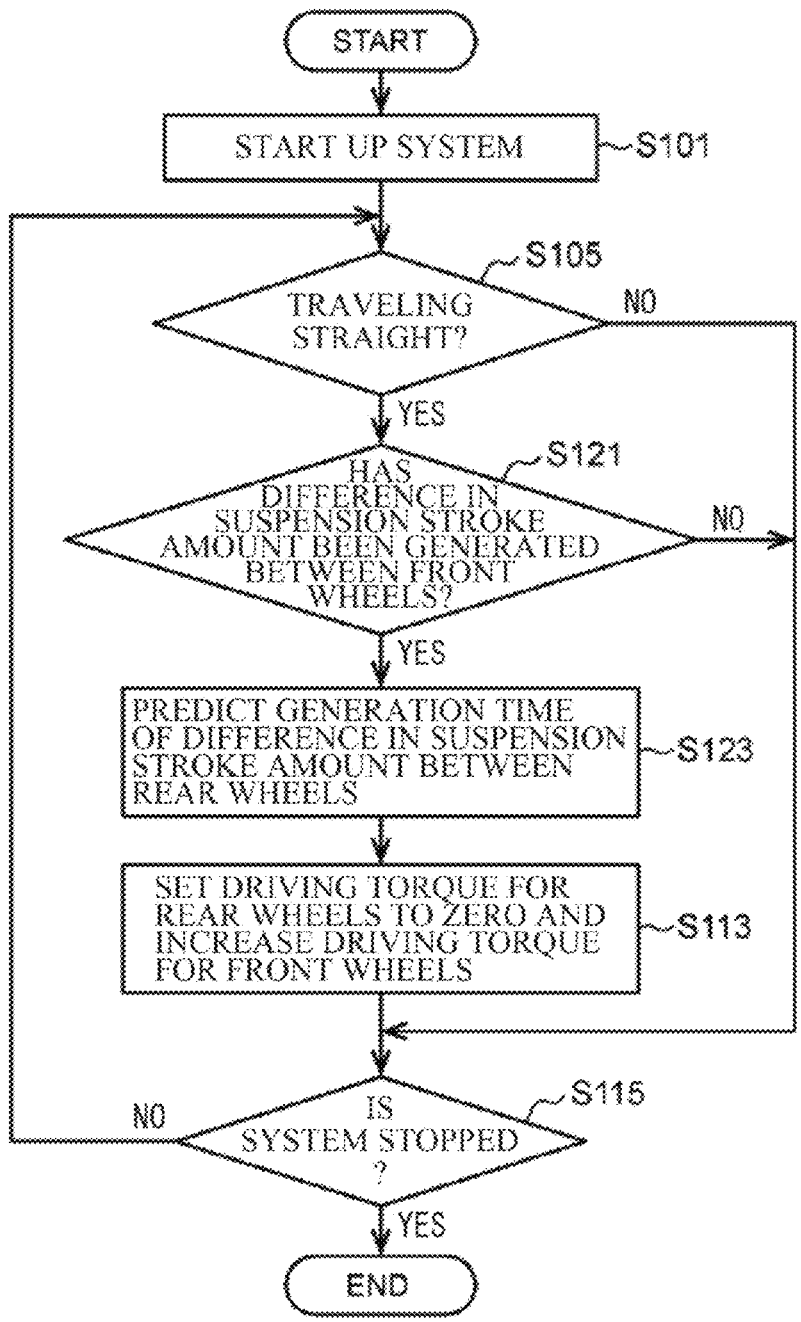
FIG. 5 is a flowchart of an operation performed by the vehicle control apparatus according to a modification example of the disclosure.

FIG. 5 is a flowchart of an operation performed by the vehicle control apparatus 50 of the vehicle 1 according to the modification example of the first example embodiment. In this modification example, instead of predicting the time of the generation of the difference in suspension stroke amount between the right and left wheels based on the result of detection by the surrounding environment sensor 31, the prediction processor 61 may predict the time of the generation of the difference in suspension stroke amount between the rear wheels 3R provided on the rear side of the vehicle 1 in the traveling direction of the vehicle 1 when the difference in suspension stroke amount is detected between the front wheels 3F provided on the front side of the vehicle 1 in the traveling direction of the vehicle 1 based on the detection value obtained by the stroke sensor 37, or based on the detection value obtained by the sensor configured to detect the transmission torque from the wheels to the road surface.

For example, the prediction processor 61 may determine whether the difference in suspension stroke amount has been generated between the front wheels 3F based on the result of detection by the stroke sensor 37 (Step S121). When it is determined that the difference in suspension stroke amount has been generated between the front wheels 3F (S121: YES), the prediction processor 61 may predict the time of the generation of the difference in suspension stroke amount between the rear wheels 3R based on the distance between the front wheels 3F and the rear wheels 3R, and the vehicle speed of the vehicle 1 (Step S123). For instance, the prediction processor 61 may determine that the difference in suspension stroke amount has been generated between the right and left wheels when an absolute amount or a derivative of the difference in suspension stroke amount between the left-front wheel 3LF and the right-front wheel 3RF (i.e., s1–s2 as described in the example illustrated in FIG. 2) detected by the stroke sensor 37 exceeds a threshold. In this case, the torque control processor 63 may set the driving torque for the rear wheels 3R to zero and increase the driving torque for the front wheels 3F by an amount corresponding to the reduction amount of the driving torque for the rear wheels 3R at or before the second predicted time of the generation of the difference in suspension stroke amount between the rear wheels 3R (Step S113), and restore the driving torque for the front wheels 3F and the driving torque for the rear wheels 3R to the original states after the rear wheels 3R pass through the region.

According to the modification example described above, the generation of the difference in suspension stroke amount between the front wheels 3F may not be predicted, but the generation of the difference in suspension stroke amount between the rear wheels 3R may be predicted based on the fact that the difference in suspension stroke amount between the front wheels 3F has been actually generated. This enhances the accuracy in predicting the generation of the difference between the rear wheels 3R. For example, the processing according to the modification example illustrated in FIG. 5 may be combined with the processing according to the first example embodiment illustrated in FIG. 4 so that the time of the generation of the difference in suspension stroke amount between the rear wheels 3R predicted based on the result of detection by the surrounding environment sensor 31 may be corrected based on the time of the generation of the difference in suspension stroke amount between front wheels 3F actually detected by the stroke sensor 37.

When the prediction processor 61 predicts the magnitude of the difference in suspension stroke amount between the right and left wheels based on the result of detection by the surrounding environment sensor 31, the predicted magnitude of the difference between the rear wheels 3R may be corrected based on the magnitude of the difference in suspension stroke amount between the front wheels 3F actually detected by the stroke sensor 37. As described above, instead of the stroke sensor 37, another sensor may be used which is configured to detect the transmission torque from the left-front wheel 3LF, the right-front wheel 3RF, the left-rear wheel 3LR, and the right-rear wheel 3RR to the road surface.

2. Second Example Embodiment

Next, a second example embodiment of the disclosure will be described. In the second example embodiment, the vehicle control apparatus is configured to predict the time of the generation of the difference in suspension stroke amount between the right and left wheels based on data received from a preceding vehicle traveling in front of the vehicle 1.

Figure 6:
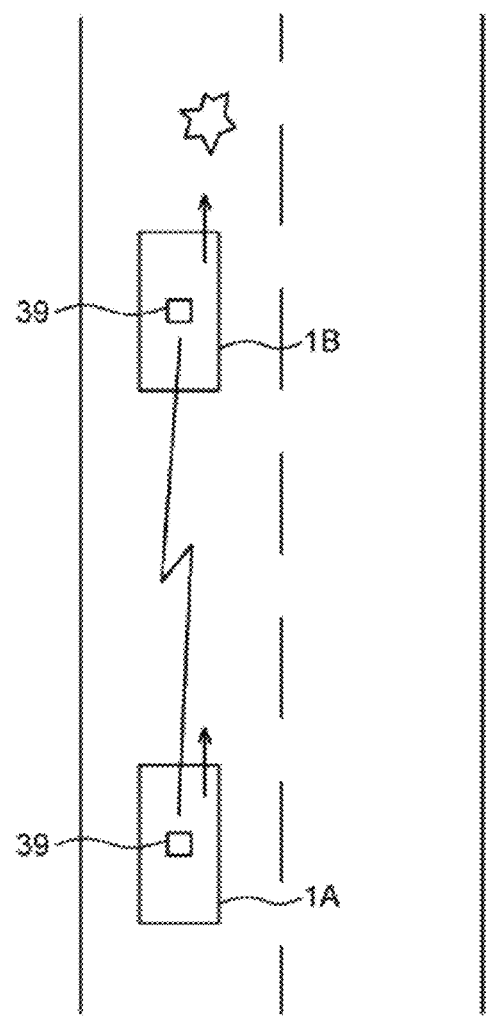
FIG. 6 is a diagram of an overall configuration of the vehicle control system according to one example embodiment of the disclosure.
Figure 7:
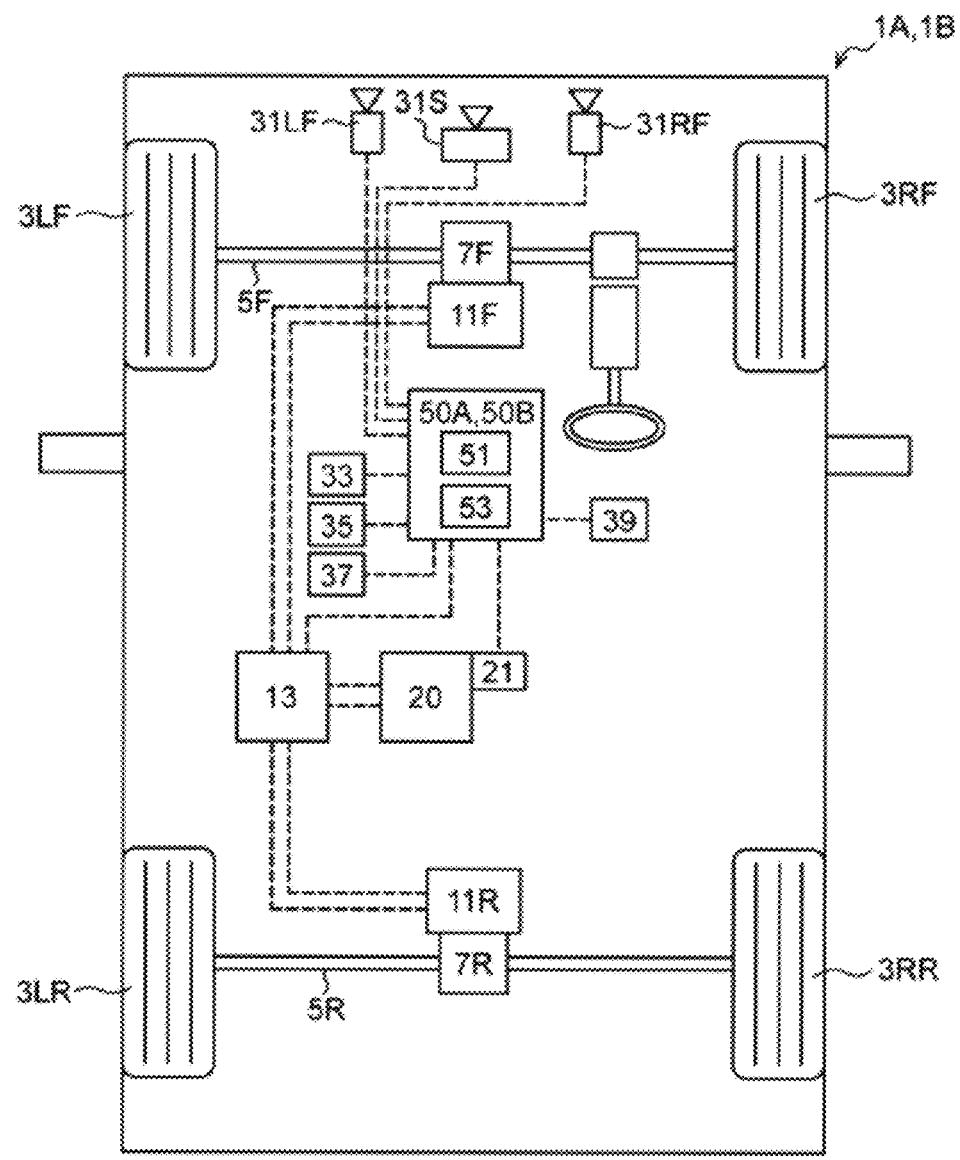
FIG. 7 is a schematic diagram of a configuration example of the vehicle in the example of FIG. 6.

FIG. 6 is a diagram illustrating an overall configuration of a vehicle control system according to the second example embodiment, and FIG. 7 is a schematic diagram of a configuration example of a vehicle in the example illustrated in FIG. 6. In the second example embodiment, the time of the generation of the difference in suspension stroke amount between the right and left wheels may be predicted based on data exchanged between a vehicle 1A and a vehicle 1B via communication. The vehicles 1A and 1B may each have a similar configuration to that of the vehicle 1 described in the first example embodiment, and may additionally include a communicator 39 that establishes inter-vehicle communication, for example. The communicator 39 may be a communicator that establishes vehicle-to-vehicle communication. For example, the communicator 39 may exchange the data directly between the vehicles 1A and 1B with wireless communication, or may exchange the data between the vehicles 1A and 1B via a network such as the Internet.

According to the second example embodiment, as illustrated in FIG. 6, when the generation of the difference in suspension stroke amount between the right and left wheels is predicted for the vehicle 1B (hereinafter also referred to as a second vehicle) traveling in front of the vehicle 1A, or when the difference in suspension stroke amount has been actually generated between the right and left wheels of the vehicle 1B, the time of the generation of the difference in suspension stroke amount between the right and left wheels of the vehicle 1A (hereinafter also referred to as a first vehicle) traveling behind the vehicle 1B is predicted, and the driving torque adapted to drive the front wheels 3F or the rear wheels 3R of the vehicle 1A is reduced at or before the predicted time of the generation.

2-1. Configuration Example of Vehicle Control Apparatus

Figure 8:
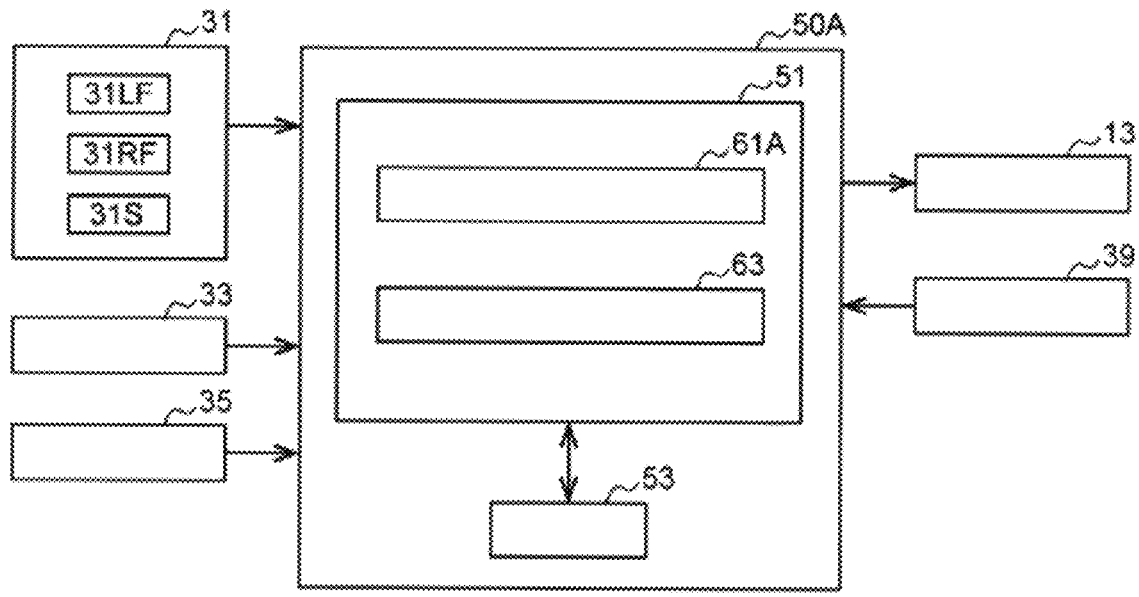
FIG. 8 is a block diagram of a configuration example of the vehicle control apparatus in the examples of FIGS. 6 and 7.
Figure 9:
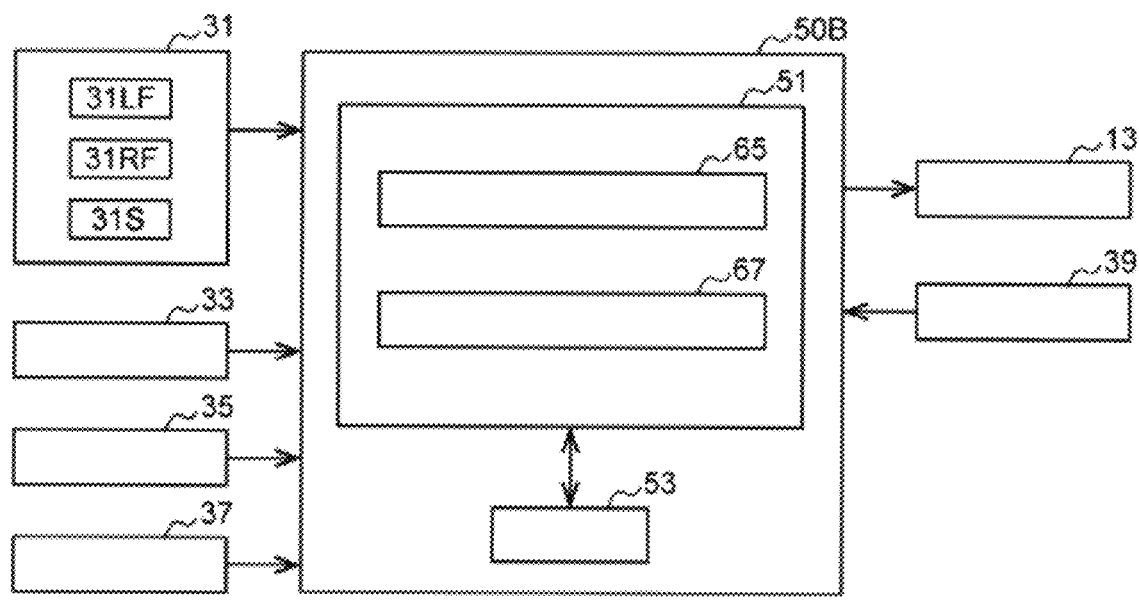
FIG. 9 is a block diagram of a configuration example of the vehicle control apparatus in the examples of FIGS. 6 and 7.

FIGS. 8 and 9 are block diagrams illustrating configuration examples of the vehicle control apparatus. In the following, exemplary configurations of the vehicle control apparatus 50A and a vehicle control apparatus 50B included in the respective vehicles 1A and 1B illustrated in FIGS. 6 and 7 are further described. Note that the vehicle control apparatuses 50A and 50B may be a common apparatus that includes all components described below. In this case, the roles of the vehicles 1A and 1B may be interchangeable. For example, when the vehicle 1A is traveling in front of the vehicle 1B, the time of the generation of the difference in suspension stroke amount between the right and left wheels of the vehicle 1B may be predicted.

The processing unit 51 of the vehicle control apparatus 50A in the vehicle 1A illustrated in FIG. 8 may include a prediction processor 61A and the torque control processor 63. These processors may be implemented when the processor such as a CPU executes a computer program; however, some of these processors may be analog circuitry.

When the vehicle 1A travels straight, the prediction processor 61A predicts the time of the generation of the difference in suspension stroke amount between the right and left wheels based on the data received from the vehicle 1B traveling in front of the vehicle 1A via the communicator 39. For example, the prediction processor 61 may predict the time of the generation of the difference in suspension stroke amount between the front wheels 3F of the vehicle 1A and that between the rear wheels 3R of the vehicle 1A based on: the data that is received from the vehicle 1B and that relates to undulations or irregularities of a road surface in front of the vehicle 1A in a traveling direction of the vehicle 1A, or the data on the region where the difference in suspension stroke amount has been generated between the front wheels 3F or between the rear wheels 3R of the vehicle 1B; the distance from the vehicle 1B to the vehicle 1A; and the vehicle speed of the vehicle 1A. The distance from the vehicle 1B to the vehicle 1A may be determined using, for example, the front imaging cameras 31LF and 31RF or the LiDAR 31S included in the surrounding environment sensor 31, or the GNSS sensor 35.

As in the first example embodiment, the torque control processor 63 reduces the driving torque adapted to drive the front wheels 3F or the rear wheels 3R at or before the time of the generation of the difference in suspension stroke amount at least between the front wheels 3F or between the rear wheels 3R.

The processing unit 51 of the vehicle control apparatus 50B in the vehicle 1B illustrated in FIG. 9 includes a determination processor 65 and an information transmitter 67. These processors may be implemented when the processor such as a CPU executes a computer program; however, some of these processors may be analog circuitry.

Like the prediction processor 61 in the first example embodiment described above, for example, the determination processor 65 may determine whether the region where the difference in suspension stroke amount is to be generated between the right and left wheels of the vehicle 1A traveling behind the vehicle 1B is present based on the result of detection by the surrounding environment sensor 31 included in the vehicle 1B. Alternatively, as in the modification example of the first example embodiment described above, when it is determined that the difference in suspension stroke amount has been generated between the front wheels 3F or between the rear wheels 3R based on the result of detection by the stroke sensor 37, the determination processor 65 may determine that the region where the difference in suspension stroke amount is to be generated between the right and left wheels of the vehicle 1A traveling behind the vehicle 1B is present.

When the determination processor 65 determines that the region where the difference in suspension stroke amount is to be generated between the right and left wheels of the vehicle 1A traveling behind the vehicle 1B is present, the information transmitter 67 may transmit data on the region where the difference in suspension stroke amount is to be generated between the right and left wheels to the vehicle 1A via the communicator 39. For example, the information transmitter 67 may transmit data on the distance from the vehicle 1B to the region where the undulations or irregularities of the road surface are present. In this case, the vehicle 1A may predict the time of the generation of the difference in suspension stroke amount between the right and left wheels of the vehicle 1A based on the distance from the vehicle 1B to the region, and the distance from the vehicle 1A to the vehicle 1B.

Alternatively, the information transmitter 67 may transmit data indicating that the difference in suspension stroke amount has been generated between the front wheels 3F of the vehicle 1B or between the rear wheels 3R of the vehicle 1B or both. In this case, the vehicle 1A may predict the time of the generation of the difference in suspension stroke amount between the right and left wheels of the vehicle 1A based on a shaft distance between the front wheels 3F and the rear wheels 3R of the vehicle 1B, and the distance from the vehicle 1A to the vehicle 1B.

2-2. Example of Processing Operation

Figure 10:
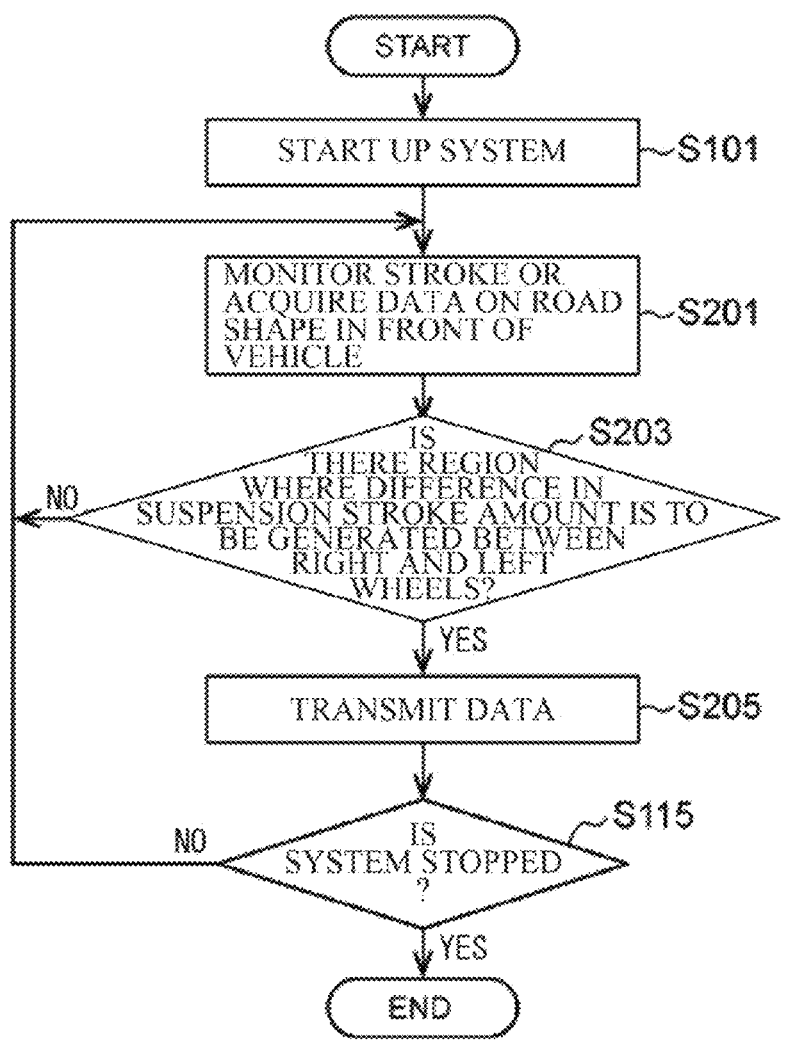
FIG. 10 is a flowchart of an operation of the vehicle control apparatus according to a modification example of the disclosure.
Figure 11:
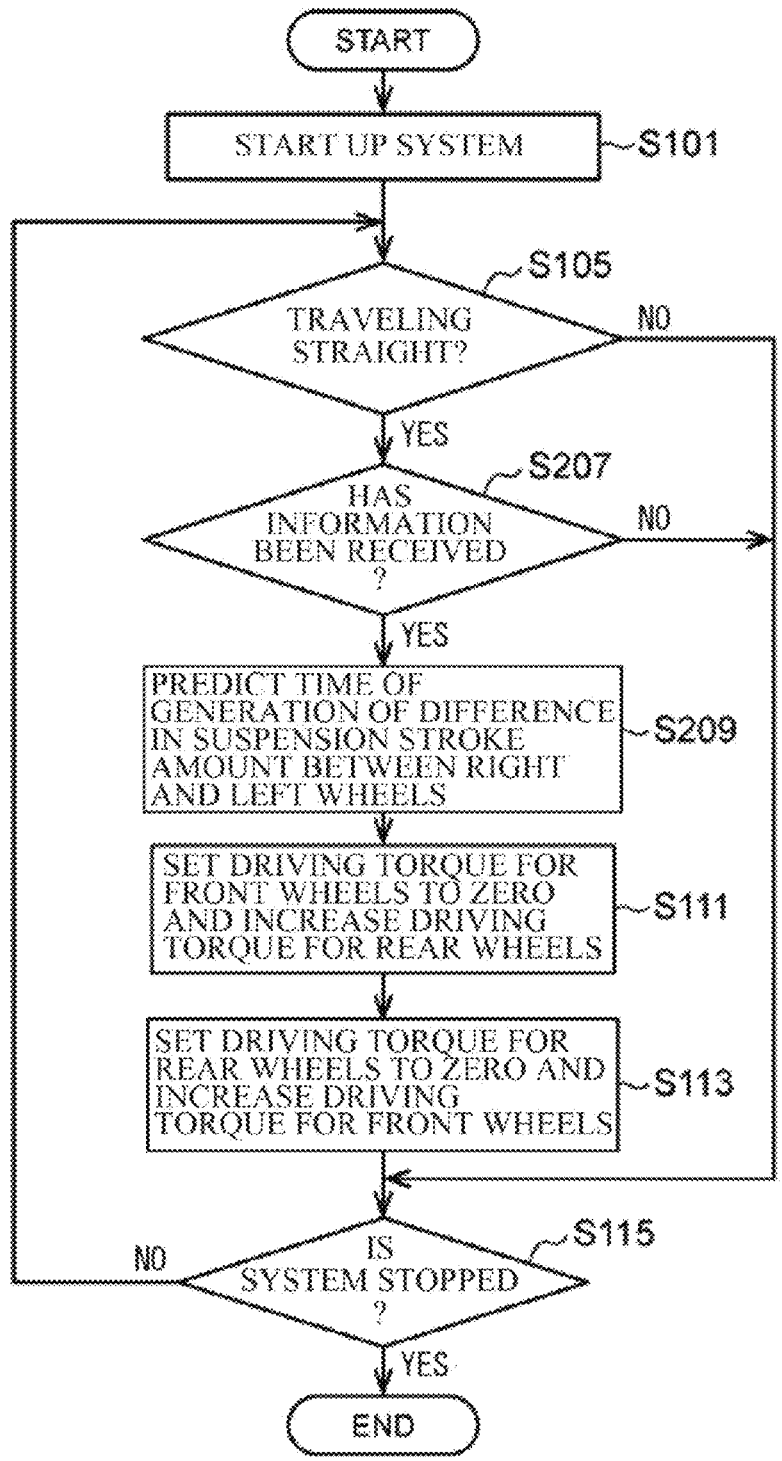
FIG. 11 is a flowchart of an operation of the vehicle control apparatus according to one example embodiment of the disclosure.

FIGS. 10 and 11 are flow charts of operations of the vehicle control apparatus 50A in the vehicle 1A and the vehicle control apparatus 50B in the vehicle 1B according to the second example embodiment. FIG. 10 illustrates the operation of the vehicle control apparatus 50B in the vehicle 1B to be performed prior to the operation of the vehicle control apparatus 50A in the vehicle 1A, and FIG. 11 illustrates the operation of the vehicle control apparatus 50A in the vehicle 1A to be performed after the operation of the vehicle control apparatus 50B in the vehicle 1B.

As illustrated in FIG. 10, when a drive system of the vehicle 1B starts up (Step S101), the processing unit 51 of the vehicle control apparatus 50B in the vehicle 1B may monitor the suspension stroke amounts of the front wheels 3F and the rear wheels 3R of the vehicle 1B, or may acquire the data on the shape of the road surface in front of the vehicle 1B in a traveling direction of the vehicle 1B (Step S201). The determination processor 65 may determine whether the region where the difference in suspension stroke amount is to be generated between the right and left wheels is present (Step S203). When it is determined that the region where the difference in suspension stroke amount is to be generated is present (Step S203: YES), the information transmitter 67 may transmit the data on the region where the difference in suspension stroke amount is to be generated to the vehicle 1A (Step S205). For example, as described above, the determination processor 65 may determine that the region where the difference in suspension stroke amount is to be generated is present, when the undulations or irregularities of the road surface are detected in front of the vehicle 1B in the traveling direction of the vehicle 1B by the surrounding environment sensor 31, or when the difference in suspension stroke amount between the front wheels 3F or the rear wheels 3R is detected by the stroke sensor 37. Thereafter, the information transmitter 67 may transmit the data to the vehicle 1A.

As illustrated in FIG. 11, when a drive system of the vehicle 1A starts up (Step S101), the processing unit 51 of the vehicle control apparatus 50A in the vehicle 1A may determine whether the vehicle 1 is traveling straight (Step S105). When the vehicle 1A is traveling straight (S105: YES), the following processing may be executed. The processing unit 51 may determine whether the data transmitted from the vehicle 1B has been received by the communicator 39 (Step S207). When the data transmitted from the vehicle 1B has been received (S207: YES), the prediction processor 61A may predict the time of the generation of the difference in suspension stroke amount between the right and left wheels (Step S209). A process to be executed after the prediction of the time of the generation of the difference in suspension stroke amount between the right and left wheels may be similar to that in the first example embodiment. That is, the torque control processor 63 may set the driving torque for the front wheels 3F and the driving torque for the rear wheels 3R to zero at or before the predicted time of the generation of the difference in suspension stroke amount (Steps S111 and S113).

2-3. Effect

According to the second example embodiment of the disclosure described above, when it is predicted that the difference in suspension stroke amount is to be generated between the right and left wheels of the vehicle 1B traveling in front of the vehicle 1A, or when the difference in suspension stroke amount has been actually generated between the right and left wheels of the vehicle 1B traveling in front of the vehicle 1A, the vehicle 1A following the vehicle 1B predicts the time of the generation of the difference in suspension stroke amount between the right and left wheels. This helps to prevent the difference in magnitude between the torque transmitted from the right wheel to the road surface and the torque transmitted from the left wheel to the road surface from being generated due to the difference in suspension stroke amount between the right and left wheels. It is therefore possible to prevent the traveling stability from decreasing. As compared with the first example embodiment in which the processing is completed in one vehicle, the processing according to the second example embodiment may involve both of the vehicles 1A and 1B. However, the time of the generation of the difference in suspension stroke amount between the right and left wheels is predicted at an earlier timing in the second example embodiment than in the first example embodiment. The configuration of the second example embodiment is therefore effective for a case where the vehicle speed is high, or a case where the detectable range of the surrounding environment sensor 31 in front of the vehicle is not sufficiently wide.

3. Third Example Embodiment

Next, a third example embodiment of the disclosure will be described. In the third example embodiment, the vehicle control apparatus is configured to predict the time of the generation of the difference in suspension stroke amount between the right and left wheels based on data acquired from a server that is an external apparatus.

Figure 12:
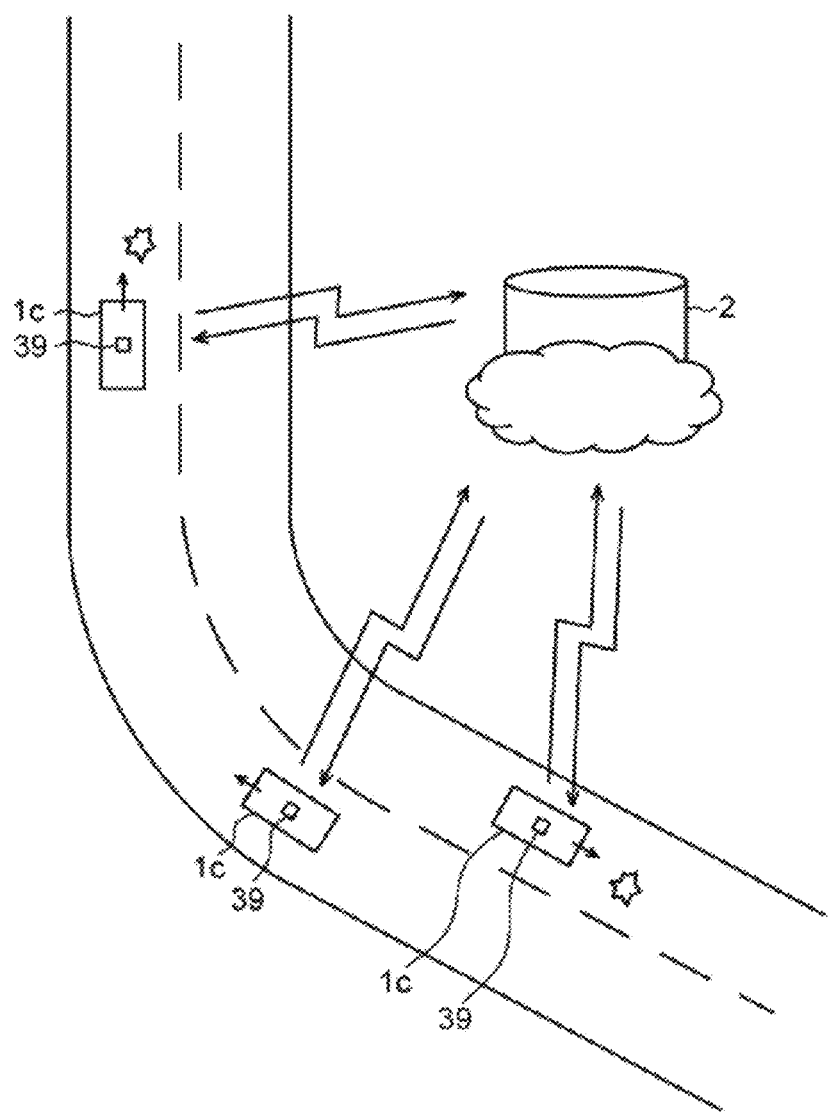
FIG. 12 is a diagram of an overall configuration of the vehicle control system according to one example embodiment of the disclosure.

FIG. 12 is a diagram illustrating an overall configuration of a vehicle control system according to the third example embodiment. In the third example embodiment, the time of the generation of the difference in suspension stroke amount between the right and left wheels may be predicted based on data exchanged between a vehicle 1C and a server 2. The vehicle 1C may include the communicator 39, as in the second example embodiment described above, for example. However, in the third example embodiment, the communicator 39 may transmit and receive data to and from the server 2 via a network such as the Internet.

The configuration of the vehicle 1C adapted to transmit the data to the server 2 may be similar to that of the vehicle 1B (the second vehicle) described in the second example embodiment. That is, the processing unit of the vehicle control apparatus in the vehicle 1C may include the determination processor that determines whether the region where the difference in suspension stroke amount is to be generated between the right and left wheel is present on the road based on the result of detection by the surrounding environment sensor 31 or the stroke sensor 37, and the information transmitter that transmits the data on the region to the server 2 via the communicator 39 when the determination processor determines that the region where the difference in suspension stroke amount is to be generated between the right and left wheel is present on the road.

The configuration of the vehicle 1C that receives the data from the server 2 may be similar to that of the vehicle 1A (the first vehicle) described in the second example embodiment. That is, the processing unit of the vehicle control apparatus in the vehicle 1C may include the prediction processor that predicts the time of the generation of the difference in suspension stroke amount between the right and left wheels based on the data received from the server 2 via the communicator 39, and the torque control processor that reduces the driving torque adapted to drive the front wheels 3F or the rear wheels 3R at or before the predicted time of the generation of the difference in suspension stroke amount at least between the front wheels 3F or between the rear wheels 3R. However, in the third example embodiment, the prediction processor may determine the distance to the region where the difference in suspension stroke amount is to be generated between the right and left wheels based on the position data detected by the GNN sensor 35 of the vehicle 1C, rather than the distance to the preceding vehicle (the vehicle 1B in the second example embodiment).

Figure 13:
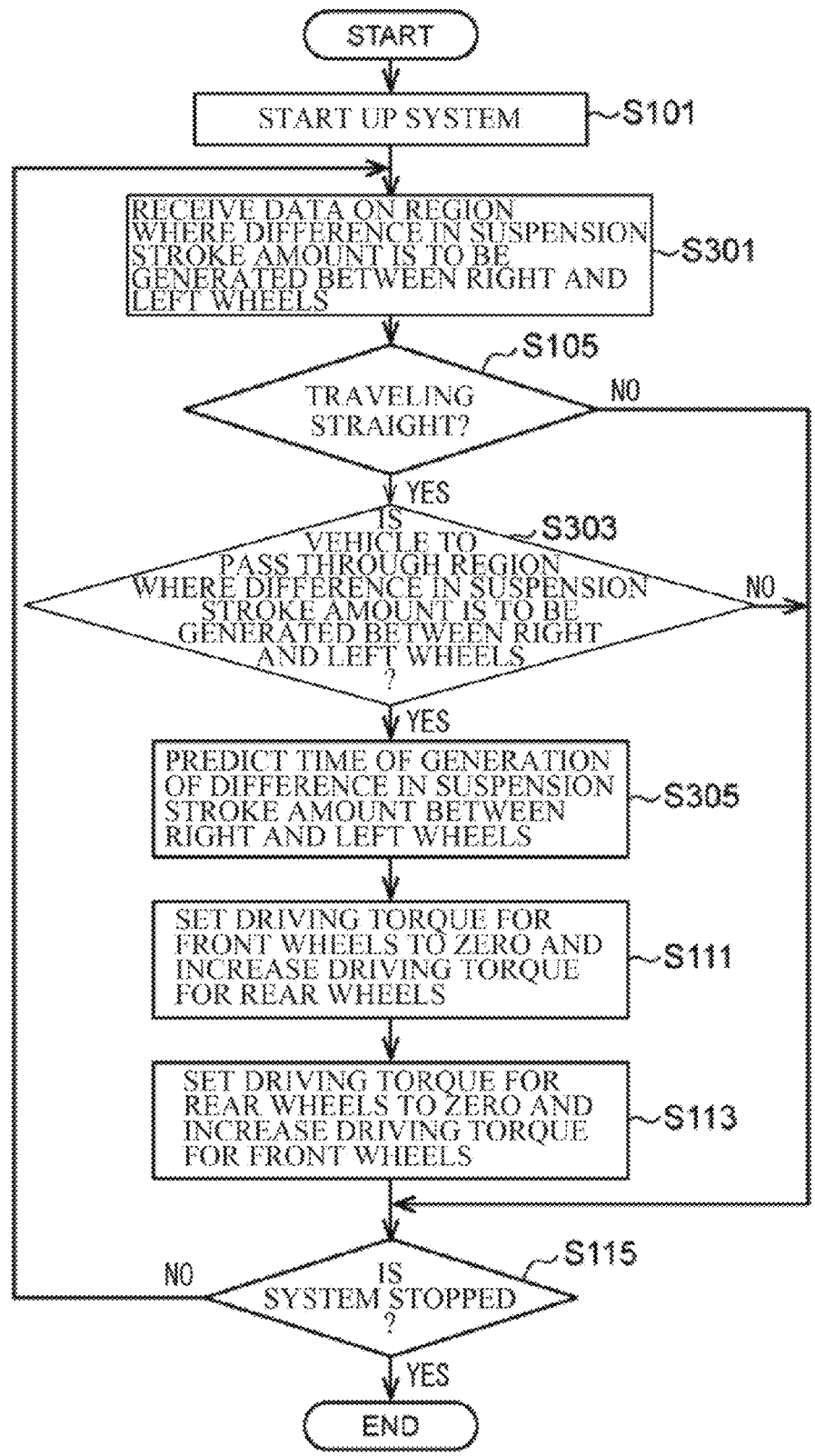
FIG. 13 is a flowchart of an operation of the vehicle control apparatus according to one example embodiment of the disclosure.

FIG. 13 is a flow chart of an operation performed by the vehicle control apparatus of the vehicle 1C according to the third example embodiment. Note that the process at the vehicle 1C to transmit data to the server 2 may be similar to that in the second example embodiment described above, and thus a duplicated description is omitted herein.

When a drive system of the vehicle 1C starts up (Step S101), the processing unit 51 of the vehicle control apparatus in the vehicle 1C may receive, from the server 2, the data on the region where the difference in suspension stroke amount is to be generated between the right and left wheels (Step S301). The data received from the server 2 may be extracted from the data having been transmitted from the other vehicle (the second vehicle or the third vehicle) to the server 2 based on the position of the vehicle 1C detected by the GNSS sensor 35, for example. In a case where the vehicle 1C is traveling straight (Step S105: YES) and where the vehicle 1C is to pass through the region where the difference in suspension stroke amount is to be generated between the right and left wheels (Step S303: YES), the prediction processor may predict the time of the generation of the difference in suspension stroke amount between the front wheels 3F and that between the rear wheels 3R based on the vehicle speed of the vehicle 1C (Step S305).

Whether the vehicle 1C is to pass through the region where the difference in suspension stroke amount is to be generated between the right and left wheel, and the distance from the vehicle 1C to the region may be determined based on the position data on the vehicle 1C detected by the GNSS sensor 35. A process to be executed after the prediction of the time of the generation of the difference suspension stroke amount between the right and left wheel may be similar to that in the first example embodiment. That is, the torque control processor 63 may set the driving torque for the front wheels 3F and the driving torque for the rear wheels 3R to zero at or before the predicted time of the generation of the difference in suspension stroke amount (Steps S111 and S113).

According to the third example embodiment of the disclosure described above, the time of the generation of the difference in suspension stroke amount between the right and left wheels of the vehicle 1C is predicted based on the data received from the server 2. This helps to prevent the difference in magnitude between the torque transmitted from the right wheel to the road surface and the torque transmitted from the left wheel to the road surface from being generated due to the difference in suspension stroke amount between the right and left wheels. It is therefore possible to prevent the traveling stability from decreasing. As compared with the first example embodiment in which the processing is completed in one vehicle, the third example embodiment may involve the processing via the server 2. However, the time of the generation of the difference in suspension stroke amount between the right and left wheels is predicted at an earlier timing in the third example embodiment than in the first example embodiment. The configuration of the third example embodiment is therefore effective for a case where the vehicle speed is high, or a case where the detectable range of the surrounding environment sensor 31 in front of the vehicle is not sufficiently wide.

As compared with the second example embodiment, the third example embodiment may involve the communication via the server 2. However, it is possible to predict the time of the generation of the difference in suspension stroke amount between the right and left wheels at an early timing as described above, even when the other vehicle is not traveling ahead in real time.

Although some of the example embodiments of the disclosure have been described in detail with reference to the accompanying drawings, the disclosure is not limited to these examples. It is apparent that those skilled in the art could have conceived of various modifications and variations within the scope of the technical idea described in the claims, and the technical scope of the disclosure should be understood as falling within the scope of the disclosure.

For example, in the above-described example embodiments, all of the components of the vehicle control apparatus may be mounted on the own vehicle; however, the disclosure is not limited to the example. For example, some or all of the components of the vehicle control apparatus may be provided in a server apparatus configured to communicate with the own vehicle via a mobile communicator, and the vehicle control apparatus may be configured to transmit and receive data to and from the server apparatus.

The invention claimed is:

1. A vehicle control apparatus for a vehicle, the vehicle comprising at least two wheel-pairs of right and left wheels, the vehicle control apparatus comprising:
one or more processors; and
one or more memories communicably coupled to the one or more processors, wherein
the one or more processors are configured to
predict, upon straight traveling of a first vehicle to which the vehicle control apparatus is to be applied, time of generation of a difference in a suspension stroke amount between the right and left wheels in any one wheel-pair out of the at least two wheel-pairs of the first vehicle based on: data that is acquired from a second vehicle traveling in front of the first vehicle and that relates to undulations or irregularities of a road surface in front of the first vehicle in a traveling direction of the first vehicle, or data on a region where the difference in the suspension stroke amount has been generated between the right and left wheels of the second vehicle upon traveling of the second vehicle; a distance from the first vehicle to the second vehicle; and a vehicle speed of the first vehicle, and
reduce driving torque adapted to drive the right and left wheels in the one wheel-pair of the first vehicle at or before the time of the generation predicted.

2. The vehicle control apparatus according to claim 1, wherein
the one or more processors are configured to predict the time of the generation of the difference in the suspension stroke amount between the right and left wheels in the one wheel-pair of the first vehicle based on: data that is detected by a surrounding environment sensor configured to detect a surrounding environment of the first vehicle and that relates to the undulations or the irregularities of the road surface in front of the first vehicle in the traveling direction of the first vehicle; and the vehicle speed of the first vehicle.

3. The vehicle control apparatus according to claim 1, wherein,
when detecting generation of the difference in the suspension stroke amount between the right and left wheels in a first wheel-pair located on a front side of the first vehicle in the traveling direction of the first vehicle out of the at least two wheel-pairs based on the suspension stroke amount of the right and left wheels of the first vehicle, or based on a detection value detected by a sensor configured to detect torque to be transmitted from the right and left wheels of the first vehicle to the road surface,
the one or more processors are configured to predict time of generation of the difference in the suspension stroke amount between the right and left wheels in a second wheel-pair located on a rear side of the first vehicle in the traveling direction of the first vehicle out of the at least two wheel-pairs.

4. The vehicle control apparatus according to claim 1, wherein
the one or more processors are configured to predict the time of the generation of the difference in the suspension stroke amount between the right and left wheels in the one wheel-pair of the first vehicle based on: data that is acquired from an external server and that relates to the undulations or the irregularities of the road surface in front of the first vehicle in the traveling direction of the first vehicle, or data that is acquired from the external server and that relates to a region where the difference in the suspension stroke amount has been generated between the right and left wheels of a third vehicle upon traveling of the third vehicle; and position data on the first vehicle.

5. The vehicle control apparatus according to claim 1, wherein
the one or more processors are configured to set the driving torque adapted to drive the right and left wheels in the one wheel-pair of the first vehicle to zero at or before the time of the generation predicted.

6. The vehicle control apparatus according to claim 5, wherein,
when the first vehicle comprises: a vehicle comprising driving torque transmission paths through which the driving torque is to be transmitted to the right and left wheels in the at least two wheel-pairs and that are separatable from each other; a vehicle configured to transmit the driving torque to the right and left wheels in the at least two wheel-pairs, respectively and independently from each other; or a vehicle configured to transmit the driving torque to the right and left wheels in any one wheel-pair out of the at least two wheel-pairs,
the one or more processors are configured to reduce the driving torque adapted to drive the right and left wheels in the one wheel-pair of the first vehicle at which the difference in the suspension stroke amount is to be generated.

7. The vehicle control apparatus according to claim 1, wherein
the one or more processors are configured to
predict magnitude of the difference in the suspension stroke amount between the right and left wheels in the one wheel-pair of the first vehicle, and
set a reduction amount of the driving torque adapted to drive the right and left wheels in the one wheel-pair based on the magnitude of the difference.

8. The vehicle control apparatus according to claim 7, wherein,
when the first vehicle comprises: a vehicle configured to transmit the driving torque to the right and left wheels in the at least two wheel-pairs of the first vehicle, respectively and independently from each other; or a vehicle configured to control a distribution of the driving torque to be transmitted to the right and left wheels in the least two wheel-pairs of the first vehicle,
the one or more processors are configured to add, to driving torque adapted to drive the right and left wheels in a second wheel-pair out of the at least two wheel-pairs, driving torque corresponding to the reduction amount of the driving torque adapted to drive the right and left wheels in a first wheel-pair out of the at least two wheel-pairs of the first vehicle.

9. The vehicle control apparatus according to claim 8, wherein,
when a margin allowed to be added to the driving torque adapted to drive the right and left wheels in the second wheel-pair is smaller than the reduction amount of the driving torque adapted to drive the right and left wheels in the first wheel-pair,
the one or more processors are configured to correct the reduction amount of the driving torque adapted to drive the right and left wheels in the first wheel-pair to an amount corresponding to the margin.

10. A vehicle comprising the vehicle control apparatus according to claim 1.

11. A vehicle control system comprising:
a vehicle control apparatus for a first vehicle; and
a vehicle control apparatus for a second vehicle,
the first vehicle and the second vehicle each comprising at least two wheel-pairs of right and left wheels, wherein
the vehicle control apparatus for the second vehicle traveling in front of the first vehicle is configured to transmit, to the vehicle control apparatus for the first vehicle, data that relates to undulations or irregularities of a road surface in front of the second vehicle in a traveling direction of the second vehicle, or data on a region where a difference in a suspension stroke amount has been generated between the right and left wheels of the second vehicle upon traveling of the second vehicle,
the vehicle control apparatus for the first vehicle comprises
one or more processors, and
one or more memories communicably coupled to the one or more processors, and
the one or more processors are configured to
predict, upon straight traveling of the first vehicle, time of generation of the difference in the suspension stroke amount between the right and left wheels in any one wheel-pair out of the at least two wheel-pairs of the first vehicle based on: data that is acquired from the vehicle control apparatus for the second vehicle and that relates to undulations or irregularities of a road surface in front of the first vehicle in a traveling direction of the first vehicle, or the data on the region where the difference in the suspension stroke amount has been generated between the right and left wheels of the second vehicle upon the traveling of the second vehicle; a distance from the first vehicle to the second vehicle; and the vehicle speed of the first vehicle, and
reduce driving torque adapted to drive the right and left wheels in the one wheel-pair of the first vehicle at or before the time of the generation predicted.

* * * * *